Patented July 18, 1939

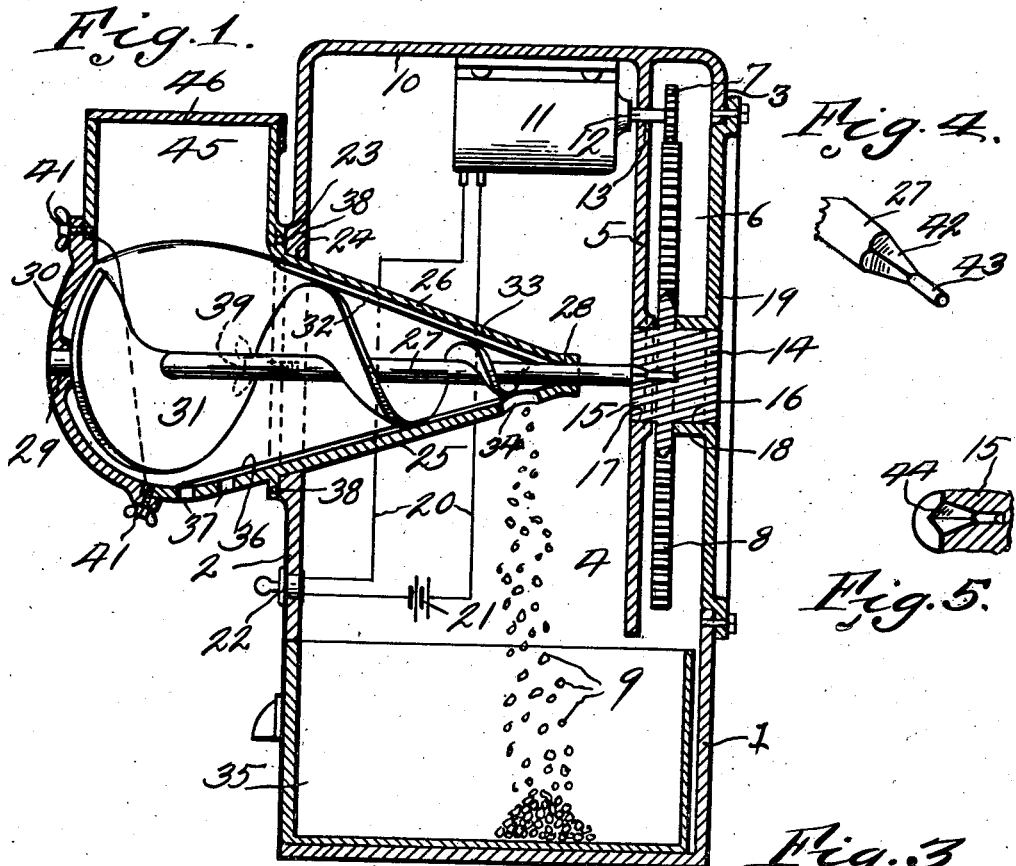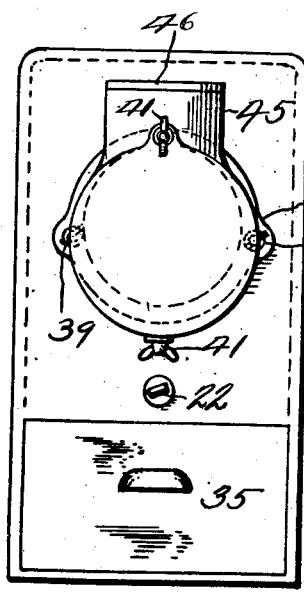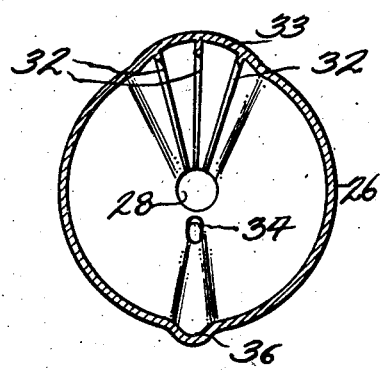

2,166,547

UNITED STATES PATENT OFFICE 2,166,547

FRUIT JUICE EXTRACTOR

James J. Horvath, South Bend, Ind.; Mary Horvath, executrix of James J. Horvath, deceased Application May 8, 1937, Serial No. 141,393

3 Claims. (Cl. 100—48)

The invention relates to juice extractors and particularly to devices wherein citrus fruit is placed and forced into a chamber by a rotatable screw or worm, cut into particles and compressed for expressing the juice therefrom.

A further object is to provide a juice expressing device comprising a casing having an opening therein, into which the conical end of the expressing device is received with the worm drive shaft extending therefrom and positioned to be received by worm drive mechanism within the casing.

A further object is to provide the upper inner periphery of the conical portion of the device with a longitudinally extending channel having severing ribs therein.

A further object is to provide means whereby the worm carrying casing may be easily and quickly removed from the casing for cleaning purposes and the worm carrying casing with a movable plate forming means, whereby the worm may be removed with its shaft from the worm carrying casing for cleaning and repair purposes.

A further object is to provide the inner end of the worm carrying casing with, an aperture, through which the compressed particles are discharged to a receptacle, within the casing. Also to provide drainage apertures beneath the worm, and to the outside of the casing, and through which extracted fluids will flow to any suitable receptacle.

A further object is to provide an auxiliary chamber within the casing and formed by a partition and the rear wall of the casing and in which chamber the gear train is housed. Also to provide an angular shaped recess in the hub of one of said gears of the gear train for the reception of a similar shaped end of the worm shaft.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the extractor.

Figure 2 is a front elevation of the extractor.

Figure 3 is a vertical transverse sectional view through the conical portion of the worm casing.

Figure 4 is a perspective view of the inner end of the worm shaft.

Figure 5 is a detail sectional perspective view of a portion of the gear hub, showing the recess for the reception of the inner end of the worm shaft.

Referring to the drawing, the numeral 1 designates the casing of the device, 2 the front wall thereof and 3 the rear wall. Disposed within the chamber 4 of the casing 1 is a downwardly extending partition 5, which forms an auxiliary chamber 6, having its lower end open. Wall 5 forms means for protecting the screw drive gears 7 and 8 from the discharged compressed and severed particles 9 after the juice expressing operation. Secured to the upper wall 10 of the casing 1 within the chamber 4 is an electric motor 11, the shaft 12 of which extends through an aperture 13 in the partition 5, and into the auxiliary chamber 6. The drive gear 7 is mounted on the shaft 12 and meshes with the large gear 8. The large gear 8 is provided with enlarged hubs or bosses 14 and 15, which are rotatably mounted in bearings 16 and 17. The bearing 16 is formed by an inwardly extending sleeve 18 carried by a removable plate 19 secured to the rear wall 3 of the casing, which, when removed, allows access to the chamber 6 for assembling purposes. The bearing 17 is disposed in the partition 5 in axial relation to the bearing 16. It will be noted that when the motor 11 is operated, gear 8 will be rotated. The operation of the motor 11 is through conductor wires 20, battery 21 and control switch 22, which switch is preferably within easy reach of the operator.

The forward wall 2 of the casing 1 is provided with an annular seat 23, surrounding a tapered opening 24 in the wall, and which receives and rigidly holds the conical portion 25 of the extractor casing 26. Rotatably mounted in the extractor casing 26 is an operating shaft 27, the inner end of which is rotated in a bearing 28 of the conical portion 25, and the outer end is rotatably mounted in a bearing 29 of a removable plate 30 carried by the outer end of the extractor casing 26. Shaft 27 is provided with a tapered worm 31, which, when rotated, forces the fruit to be severed and compressed into the conical portion 25 of the casing. As the fruit is compressed and rotated by the worm, it is severed by the longitudinally extending cutting ribs 32 in the upwardly offset channeled portion 33 of the casing 26, as clearly shown in Figure 3.

As the fruit is severed and forced into the reduced end of the casing 26, it is simultaneously reduced to particles and compressed, and the particles eventually forced through the discharge aperture 34 in the bottom of the casing 26 and fall by gravity into the removable receptacle 35. The expressed juices pass into the channel 36 in the bottom of the casing 26 and flow downwardly and outwardly and eventually pass through discharge apertures 37 in the bottom of the casing 1, and into any suitable receptacle. The casing 26 is preferably centered by means of centering pins 38 and is held rigidly against the seat 23 by means of wing nuts 39 which pass through a flange 40 carried by the casing 26. It will be noted, by referring to Figure 1, that the removable plate 30 closes an opening through which the worm 31 may be removed for cleaning purposes and the plate held in position by removable screws 41.

The inner end of the worm shaft 27 is angularly shaped in cross section as shown at 42 and preferably tapered, and terminates in a round guide portion 43. The boss 15 of the gear 8 is provided with a recess 44, corresponding in shape to the inner end of the shaft 27, and is adapted to receive said shaft end so that when the gear 8 is rotated through the medium of the drive gear 7 carried by the motor 11, rotation will be imparted to the worm 31 for the severing and compressing operation. By this particular construction, it will also be seen that the device may be easily and quickly assembled or disassembled by the manipulation of the thumb screws 39 and the portion 43 of the shaft 27 will guide the angular shaped end of the shaft 27 into its bearing 44, during the assembling operation.

Fruit is placed in the hopper 45 and is fed downwardly between the convolutions of the worm 31 and is compressed into the conically shaped portion 25 of the worm casing. Hopper 45 is preferably provided with a closure 46 to keep out foreign matter and to hold down the fruit at the starting of the expressing operation if necessary.

The invention having been set forth what is claimed as new and useful is:

1. A juice expressing device comprising a housing, a worm casing removably mounted and extending into one side of the housing and having a worm therein, said casing having a feed opening and a juice discharge opening therein exteriorly of said housing and a refuse discharge opening therein interiorly of said housing, a worm drive means within the housing, a worm shaft extending from the worm casing and having a separable driving connection with the worm drive means within the housing.

2. A juice expressing device comprising a housing, a worm casing removably mounted and extending into one side of the housing and having a worm therein, said casing having a feed opening and a juice discharge opening therein exteriorly of said housing and a refuse discharge opening therein interiorly of said housing, a worm drive means within the housing, a worm shaft extending from the worm casing and having a separable driving connection with the worm drive means, a removable plate carried by the outer end of the worm casing, said removable plate forming a supporting bearing for one end of the worm shaft and a closure for an opening in the worm casing through which the worm may be removed.

3. The combination with a juice extractor comprising a housing, a worm casing conically shaped and extending into the housing from one side thereof, a worm within the worm casing, the bottom of said worm casing being channeled and terminating in a refuse discharge aperture within the housing and in juice discharge apertures to the outside of the housing, and severing ribs longitudinally disposed within the conically shaped casing and a worm within the conically shaped casing and driven from within the casing.

JAMES J. HORVATH.